United States Patent
Barefoot

(10) Patent No.: US 6,739,204 B1
(45) Date of Patent: May 25, 2004

(54) VELOCITY MEASURING APPARATUS TO ESTABLISH PURGE GAS VELOCITY PRIOR TO WELDING

(76) Inventor: Byron Barefoot, 8432 Quarry Rd., Manassas, VA (US) 20110

( * ) Notice: Subject to any disclaimer, the term of this patent is extended or adjusted under 35 U.S.C. 154(b) by 0 days.

(21) Appl. No.: 10/186,425

(22) Filed: Jul. 2, 2002

(51) Int. Cl.[7] .................................................. G01F 1/20
(52) U.S. Cl. ..................... 73/861.32; 219/75; 219/136; 228/220; 228/42
(58) Field of Search ..................... 73/861.32; 219/74, 219/75, 136; 228/218, 219, 220, 42

(56) References Cited

U.S. PATENT DOCUMENTS

| | | | |
|---|---|---|---|
| 2,792,490 A | | 5/1957 | Risch et al. |
| 3,614,378 A | | 10/1971 | Goodell et al. |
| 4,723,064 A | | 2/1988 | Bothe, II |
| 4,845,331 A | | 7/1989 | Yeo et al. |
| 5,304,776 A | | 4/1994 | Buerkel et al. |
| 5,425,492 A | * | 6/1995 | Thode .......................... 228/102 |
| 5,440,096 A | | 8/1995 | Ikeda et al. |
| 5,824,983 A | | 10/1998 | Huddleston, Jr. |
| 5,997,109 A | | 12/1999 | Kautsch |
| 6,039,240 A | | 3/2000 | Barefoot |
| 6,172,320 B1 | | 1/2001 | Krishnan et al. |

* cited by examiner

Primary Examiner—Edward Lefkowitz
Assistant Examiner—Jewel V. Thompson
(74) Attorney, Agent, or Firm—McGuireWoods LLP

(57) ABSTRACT

Velocity/flow measuring of purge gas when welding pipe, is accomplished by providing a controllably fixed orifice at the distal end of the pipe being welded. The purge gas passes through a pressure regulator, a flow meter, and a purifier. An isolation/control valve is used to control access to the purge gas. The purge gas then passes through a header connected to the input end of the first pipe. A second pipe is positioned adjacent to the first pipe. A pressure clamp, tape or other sealing means seals the circumferential weld area between the first pipe and the second pipe. A second pressure gauge monitors the gas pressure at the pressure clamp. The purge gas passes through the weld area, to a manifold in fluid communication with a first pressure gauge, a back pressure control means and to a weld purge orifice fitting, having a selected orifice size. The selected orifice size of the weld purge orifice fitting is used to establish the velocity/flow of the purge gas exiting from the first and second pipe sections during welding. The branch lines are vented by vent purge caps to evacuate and remove contaminates from the branch lines, and to eliminate back streaming of contaminates into the line to be welded.

40 Claims, 5 Drawing Sheets

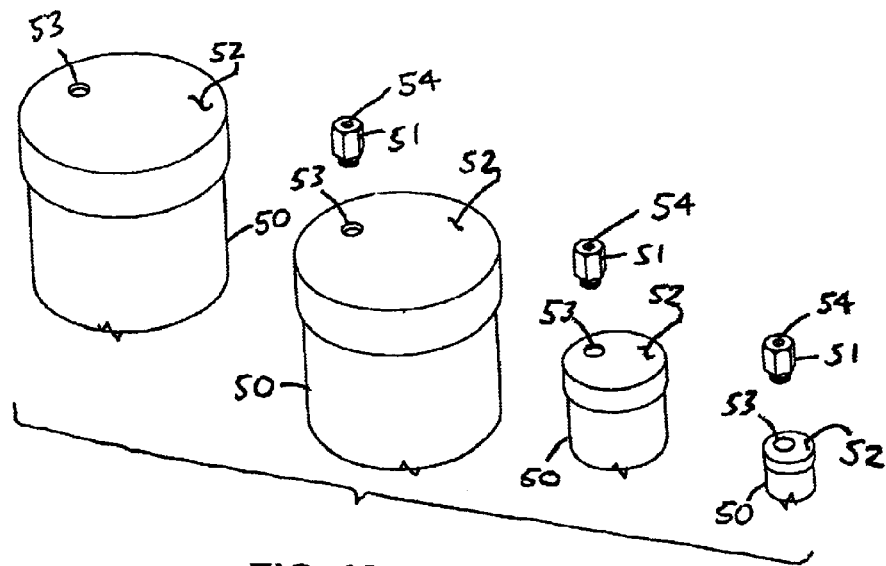
FIG. 2B
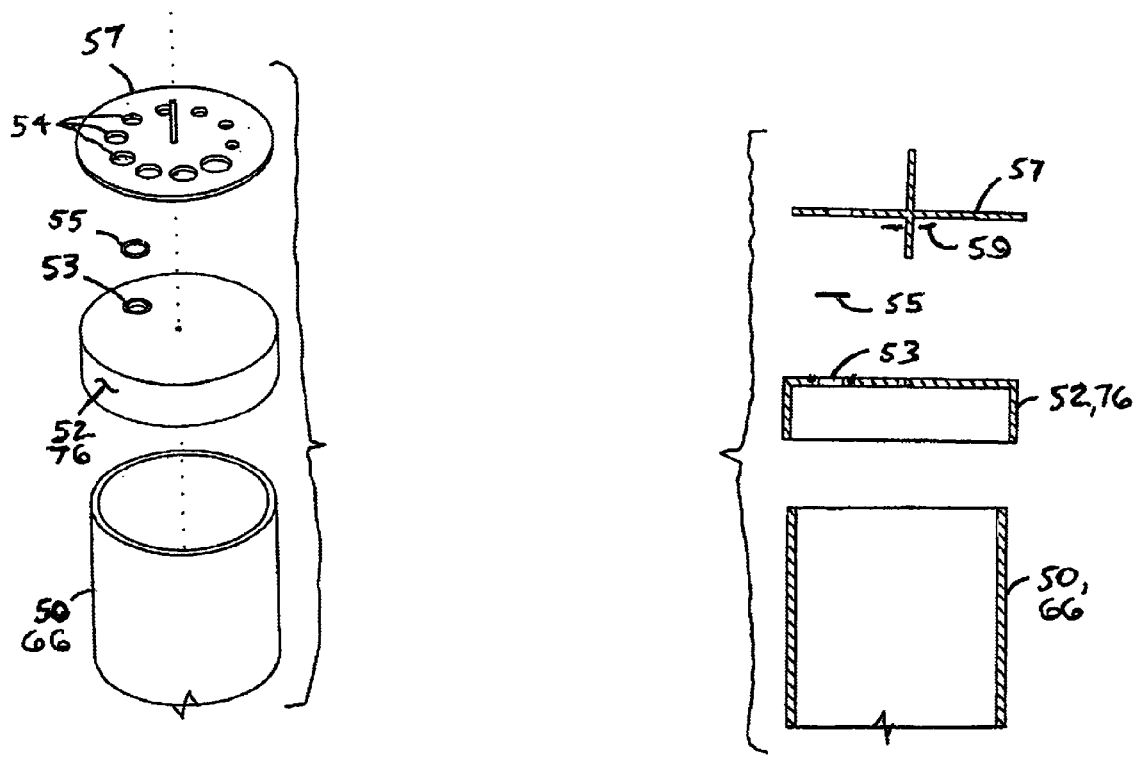
FIG. 2C  FIG. 2D

VELOCITY MEASURING APPARATUS TO ESTABLISH PURGE GAS VELOCITY PRIOR TO WELDING

CROSS REFERENCE TO RELATED APPLICATIONS

Not Applicable

STATEMENT REGARDING FEDERALLY SPONSORED RESEARCH DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to welding, and more particularly to a method and apparatus to measure the velocity of a purge gas through the inner diameter of conduit pipe and tubing prior to precision welding.

2. Background of the Invention

Precision welding is required during the fabrication of modern manufacturing plants, food processing equipment, clean rooms, semiconductor and electrical fabrication facilities, etc. Long runs of conduit pipe are often used, which require precision welding of fittings to conduit pipe and tubing, for carrying a variety of process gasses and liquids throughout the facility.

Stainless steel conduit piping and tubing, ranging from 0.0625 inch diameter to about eight inches in diameter is often used in the installation of equipment used during the manufacturing, processing and assembly processes of modern manufacturing and processing facilities. The length of the conduit pipeline, the quantity and quality of welds required, and the purity of the gasses transmitted through the pipeline, often require a consistent, high quality welding technique.

Precision orbital welding is one technique that uses the electrode to orbit around the conduit pipe joint during the welding process, while an inert purge gas flows through the pipeline. Each welded pipe section increases the length and volume of the pipeline, which in turn may vary the purge gas flow characteristics. Back pressure control apparatus is noted in the prior art, but controlling back pressure solves only part of the problem. The velocity of the purge gas passing through the conduit pipe being welded, also significantly affects the quality of the weld.

The pressure of the purge gas is dependent upon the length of the conduit pipe, the size of the pipe, the volume of flow, the number of bends, the number of branches extending from the conduit pipe, and the type of purge gas used.

The problem of controlling the velocity of the purge gas has not been satisfactorily addressed or resolved by the prior art. Thus, this invention both addresses and solves the velocity control problem, improving the quality of weld by significantly reducing problems associated with controlling and removing impurities generated during the welding process, and also the back streaming of contamination from the branch lines into the conduit to be welded, as well as evacuation of the tubing.

The prior art includes U.S. Pat. Nos. 5,864,111 and 6,039,240 by the present inventor, Byron G. Barefoot, issuing Mar. 21, 2000, which discloses a welding backpressure control apparatus. This apparatus effectively controls the internal pressure of purge gas during the welding process, but does not address the problem of establishing the correct velocity or flow of the purge gas for the welding process.

U.S. Pat. No. 5,824,983 issuing Oct. 20, 1998 to Richard Huddleston, Jr., discloses a weld assembly purge restrictor. The purge restrictor is used to control pressure, not velocity of the purge gas. The restrictor does not seal airtight.

U.S. Pat. No. 5,597,109 issuing Jan. 28, 1997 to Tadahiro Ohmi et al., discloses a welding method for forming chromium oxide passivated film at the welded portion. This welding apparatus does not establish the velocity of purge gases prior to the welding process.

U.S. Pat. No. 5,440,096 issuing on Aug. 8, 1995 to Nobukazu Ikeda et al., discloses a welding process with delayed application of full current until after the start of the arc. This patent uses an orifice as a restrictor to create backpressure, and a flow meter to set flow. The orifice does not measure or control the velocity of the purge gas, and does not include a fixed orifice at the outlet end to control the velocity or flow of the purge gas through the system to be welded.

U.S. Pat. No. 5,304,776 issuing on Apr. 19, 1994 to Steven Buerkel, discloses a system for welding pipes, wherein pressure is varied as the welder orbits the pipe being welded, to minimize the undercutting and concavity of the roots of the weld, caused by gravitational effects during the weld process. In this invention, the pressure and flow is varied, whereas in the present application the velocity/flow remains constant.

U.S. Pat. No. 4,845,331 issuing Jul. 4, 1989 to Denis Yeo et al., discloses a pressurized weld chamber. In this patent, constant pressure is provided in a weld chamber, while a shielding gas sweeps away metal vapors. This patent includes a flow meter and needle valve at the outlet, but does not include a fixed orifice to control the velocity of the purge gas.

U.S. Pat. No. 4,723,064 issuing Feb. 2, 1988, to Bill Bothe II, discloses a purge gas system for welding pipes, using a purging plug. There is no teaching in this patent to control the velocity of the purge gas during the welding process by including a fixed orifice to control the velocity/flow of the purge gas. Back pressure is created by hermetically sealing off the end of the pipe to maintain purge gasses within the pipe during welding.

U.S. Pat. No. 3,614,378 issuing Oct. 19, 1971 to Stuart Goodell et al., discloses a fluxless high-frequency aluminum tube welding method, with continuous pressure purging. There is no teaching to control the velocity of the purge gas during the welding process.

BRIEF SUMMARY OF THE INVENTION

Setting of the velocity/flow of purge gas prior to welding, particularly in conduit pipe and tubing, is accomplished by providing a controllably fixed orifice at the distal end of the pipe being welded. The fixed orifice or orifices effectively measures the velocity/flow of the purge gasses prior to welding. The purge gas pressure is preferably from 5 PSI to 100 PSI. The flow is controlled by a metering type shutoff valve.

The purge gas passes through a header connected to the input end of the first conduit pipe section to be welded. The second conduit pipe section to be welded is positioned adjacent to the first conduit pipe to be welded. A pressure clamp or other sealing means is used to seal the circumferential weld area between the first pipe section and the second pipe section. A second pressure gauge monitors the gas pressure at the pressure clamp. Purge gas passing through the first pipe section and over the weld area, then passes through the second pipe section to a manifold with an outlet orifice placed upon the distal end of the second pipe. Purge gas passes through the manifold to the outlet orifice. A back-pressure control means is in fluid communication with the manifold. A first pressure gauge monitor is connected to the manifold, to monitor the pressure of the purge gas as the purge gas passes through the manifold. One or more vent caps, having a controlled orifice size, are airtight and releasably secured to the outlet end of the manifold, to establish the velocity of the purge gas flowing through the conduits and over the area to be welded. Multiple fittings or branch conduit pipe sections may be located on the first or second pipe, and each fitting or conduit has a vent cap with a controlled orifice to control pressure and velocity/flow of the purge gas through each branch connection during welding. This flow is from one percent to ten percent of the flow over the weld.

Thus, one object of this invention is to establish the velocity of the purge gas flowing over the point to be welded prior to welding the joint for improved weld quality and control.

Another object of this invention is to provide vent purge caps on each branch attached to the line to be welded. Each vent purge cap has a controlled orifice size to control the velocity/flow of the purge gas through the branch line pipes during the welding process.

Yet another object of this invention is to provide a selection of vent purge caps, each vent purge cap having a controlled orifice size, the vent purge cap selected according to the diameter of the conduit pipe or fitting to be vented.

Still another object of this invention is to provide a second pressure gauge in fluid communication with the pressure clamp, and a first pressure gauge in fluid communication with the manifold, and velocity/flow is established by pressure readings on the first pressure gauge, and the second pressure gauge is used to set pressure at the weld site.

Other objects, features and advantages of this invention will become obvious to one of average skill in this art upon consideration of the following description when read in conjunction with the following drawings.

BRIEF DESCRIPTION OF SEVERAL VIEWS OF THE DRAWINGS

FIG. 2B is an alternate enlarged view of four fixed vent/purge cap orifices mounted in an aperture in a suitable pipe or conduit cap.

FIG. 2C is an enlarged exploded view of a variable vent/purge cap, having a variety of orifice sizes, which are selectable by rotating a disc secured to the vent/purge cap.

FIG. 2D is an exploded cross sectional view of the variable vent/purge cap shown in FIG. 2C, showing a means for securing the rotating disc to the vent/purge cap.

Figure 1:
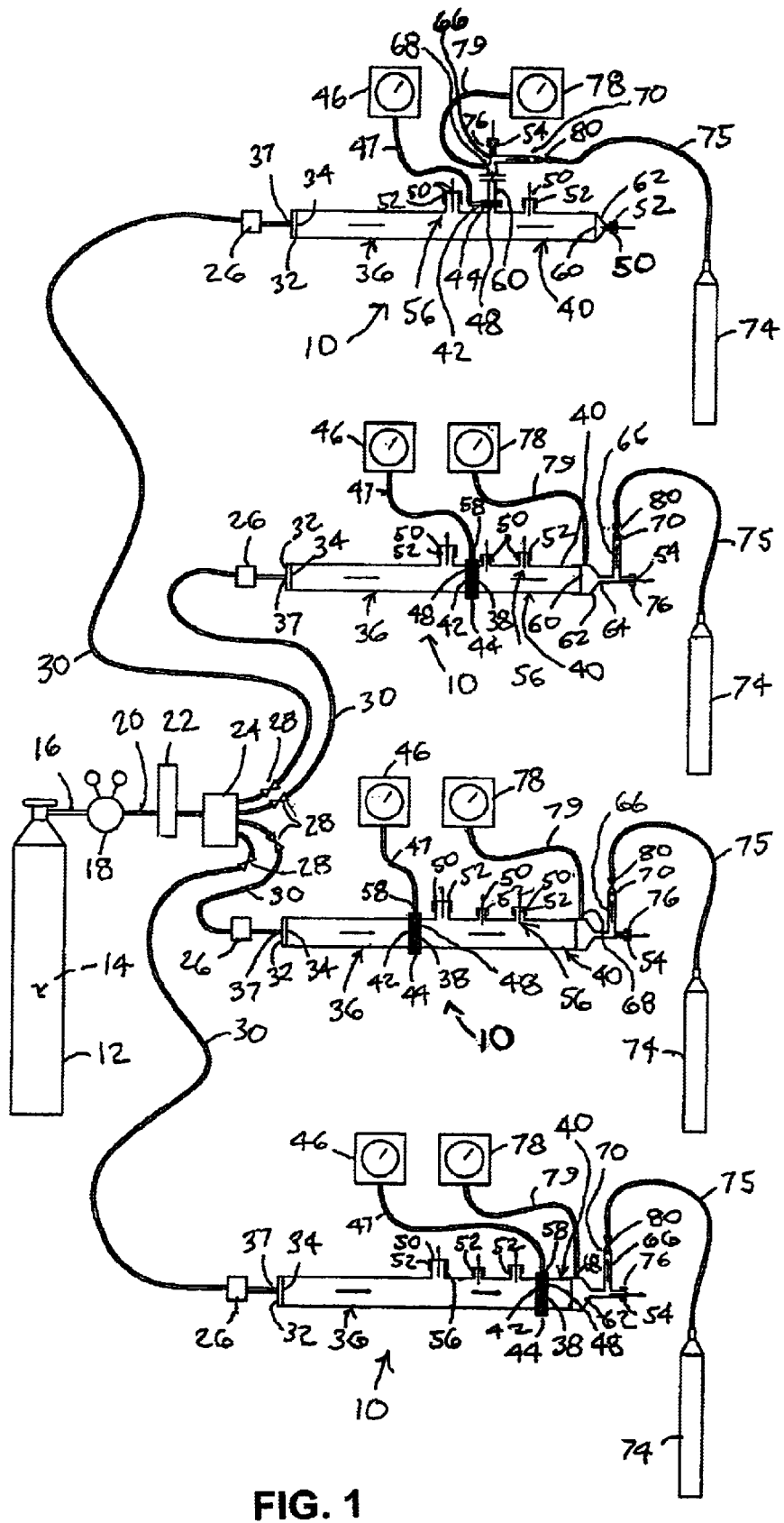
FIG. 1 is a diagrammatic view of the apparatus used to establish the correct velocity/flow of purge gasses prior to welding.

Specific embodiments of this invention are shown by way of preferred example embodiments. The preferred embodiment of this invention as disclosed in the drawings and specification, is not intended to limit the scope of this invention, as defined by the appended claims.

DETAILED DESCRIPTION OF THE INVENTION

Figure 5:
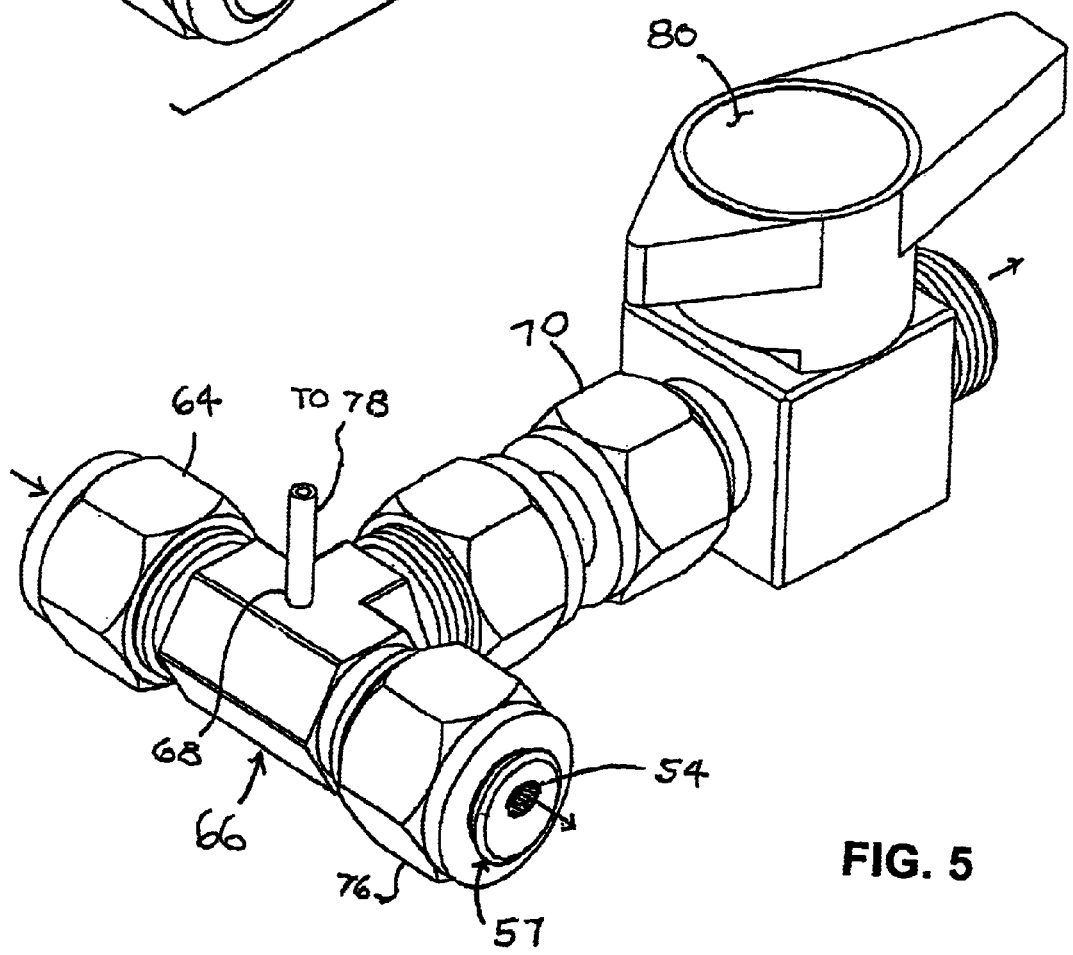
FIG. 5 is a detail view of the manifold used to connect the discharge end of the second pipe to the first pressure gauge, the weld pressure control/isolation valve, and the selected weld purge orifice.

FIG. 5 is a diagrammatic view of the velocity/flow measuring apparatus 10 used to establish and measure the velocity/flow of purge gasses 14 prior to welding.

As shown in FIG. 1, a purge gas supply tank 12 containing one or more types of purge gasses 14, is in fluid communication via supply line 16 to a pressure regulator 18. The pressure regulator 18 preferably controls the purge gas 14 pressure within a preferred range of 5 (psi) to 100 (psi) pounds per square inch.

Inert gasses used as purge gasses include, argon, nitrogen, $CO_2$, helium or a mixture thereof. Pharmaceutical uses typically require a lower flow velocity, whereas semiconductor uses typically require a higher flow velocity.

Purge gas 14 passing through the pressure regulator 18, is directed through supply line 20 to a flow meter 22. The flow meter 22 may be adapted to include a purifier 24 having a chemical filter 26 to control the amount of oxygen and moisture in the purge gas 14. Preferably, the purifier 24 limits the amount of oxygen and moisture content to a maximum of ten (ppb) parts-per-billion.

A control/isolation valve 28 may be positioned before or after the flow meter 22, to shut off the purge gas 14, when this apparatus 10 is not in use. All connections must be air tight. The purge gas 14 exiting from the flow meter passes through a supply line 30, to a first welding header 32, which seals the inlet end 34 of the first pipe 36 to be welded. An inlet fitting 37 located on the welding header 32 connects supply line 30 to the first conduit pipe 36 section.

The inlet end 38 of a second conduit pipe 40 section to be welded, is positioned adjacent the exit end 42 of the first conduit pipe 36 section, and secured in position by tacking end 42 to end 38. Alternately, the exit end 42 and conduit pipe 38 are placed in a weld fixture block (not shown), in a manner well known in the art. A pressure clamp 44 is positioned over the area to be welded 48 located between the exit end 42 of the first pipe 36 and the inlet end 38 of the second pipe 40, to seal the connection between the first and second conduit pipe sections 36, 40. Other joints may be temporarily sealed-with tape during the welding process. All joints and open ends must be closed air tight or covered with a controlled orifice prior to setting the velocity/flow of the purge gas.

A second pressure gauge 46 connects to the pressure clamp 44 by supply line 47, to monitor the pressure of the purge gas 14 in the vicinity of the weld area 48 between the exit end 42 of the first pipe section 36 and the inlet end 38 of the second pipe section 40. The second pressure gauge 46 is preferably a magnehelic pressure gauge, such as manufactured by Dwyer. The second pressure gauge 46 preferably measures the purge gas pressure, of about 0–10 inches of water column pressure.

Open end branch pipe fittings 50 and conduit pipe sections, located on the second pipe(s) 40 are vent/purge capped 52 as shown in FIG. 2B, to control the velocity/flow of the purge gasses 14 passing through the branch pipe or fittings 50. All pipe and fittings 50 are capped with a vent/purge cap 52 having a fixed orifice 54, as shown in FIG. 2B. The vent purge cap 52 is sized to fit the size of the pipe or fitting 50. The fixed orifice 54 is sized according to the diameter size of the conduit pipe being vented and is 1 to 10% of the selected weld velocity/flow, as shown in the chart provided in FIG. 3. This sets the desired velocity/flow of the purge gas 14 within each branch pipe or fitting 50.

FIG. 2B shows a standard conduit pipe cap or plug adapted for a selected fixed orifice fitting.

FIG. 2C shows an adjustable size vent/purge cap 52 and orifice.

FIG. 2D is an enlarged view of the adjustable size vent/purge cap and orifice, shown in FIG. 2C.

Figure 2A:
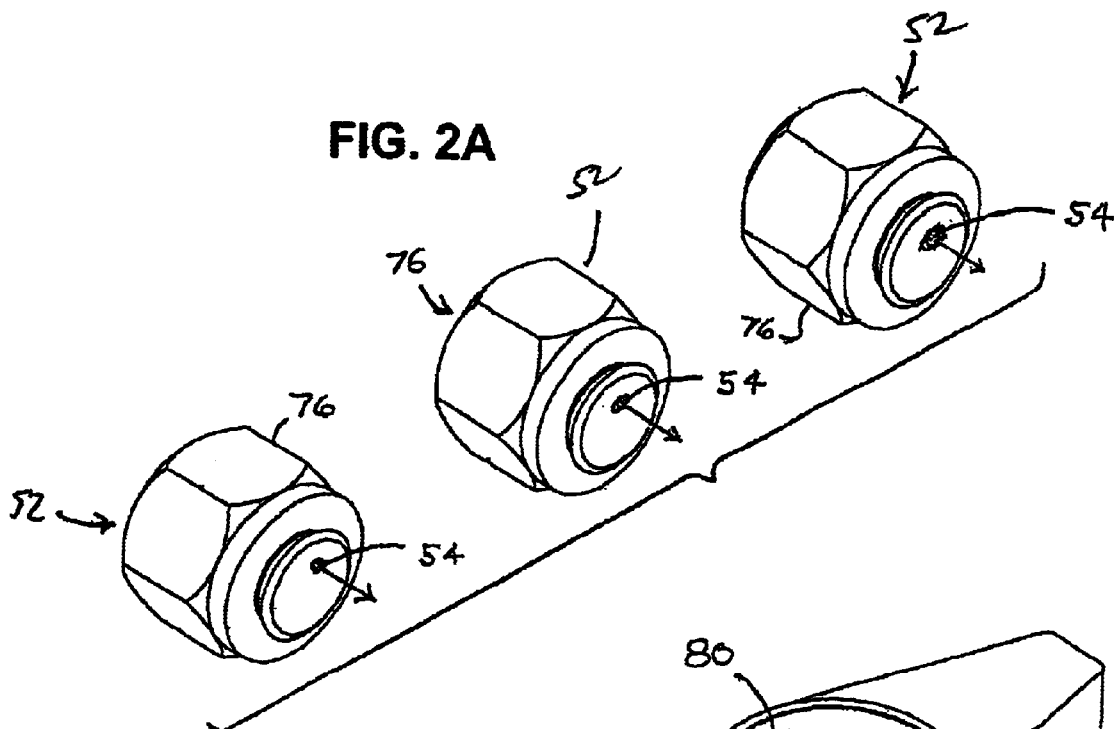
FIG. 2A is an enlarged view of three alternate fixed weld purge orifices showing various sized orifices having a preferred offset location of the controlled orifice used to establish the velocity/flow of the purge gasses used during welding.

Rotatable disk 57 with multiple fixed orifices (FIG. 2C and 2D) will attach as an alternative fitting to the weld purge orifice fitting 76 shown in FIG. 2A and FIG. 5. This will attach to the manifold 66 and become the weld purge orifice fitting 76 with a selection of fixed orifices.

Figure 4:
FIG. 4 is a pressure flow chart showing the preferred ID pressure in inches of water to be maintained during the weld.

FIG. 4 is used to establish the pressure required at the weld site prior to welding.

FIG. 5 is used to establish the velocity/flow to be maintained over the weld area during the welding process. The fixed orifice 54 at a predetermined pressure lets purge gasses 14 pass therethrough, to set the velocity/flow of the purge gasses 14 over the weld area within the pipe assembly 56 prior to welding.

The branch lines are purged to evacuate the impurities or contaminates in the branch lines so that the impurities do not back stream into the line being welded. Preferably, 1% to 10% of the total flow of the purge gas passing through the conduit to be welded is vented through each of the branch lines. For example, a two inch pipe to be welded will require a velocity of 2½ ft/sec, which equals 172 cubic ft per hour of flow over the weld area. The flow through each branch line will be approximately 1–10% (1.7 to 17.2 CFH) of the flow of the purge gas passing through the conduit to be welded.

The outlet end 60 of the second conduit pipe section 40 is connected and releasably secured to an airtight outlet welding header 62, which seals off the outlet end 60 of the second conduit pipe section 40. An inlet manifold fitting 64 is secured to the outlet welding header 62. The inlet manifold fitting 64 is in turn connected to a manifold 66. The manifold 66 preferably has one inlet connection and two outlet connections. The inlet of the manifold 66 connects to the outlet of the welding header 62, and a first manifold outlet connects to the weld purge orifice fitting 76, and a second manifold outlet 70 is connected to the back pressure control outlet.

The manifold 66 preferably has a first gauge connection fitting 68, a second weld backpressure control connection fitting 70. The first gauge connection fitting 68 is connected to a first pressure gauge 78 over a supply line 79. The second weld backpressure connection fitting 70 is connected to a back pressure control device 74 over supply line 75. The back pressure control device 74 is preferably the type disclosed and claimed in U.S. Pat. No. 6,039,240 and U.S. Pat. No. 5,864,111, each of which issued to the present inventor, Byron G. Barefoot, on Mar. 21, 2000.

An isolation valve 80 may be positioned in supply line 75 to selectively stop all flow to the back pressure flow device 74. The first pressure gauge 78 is then adjusted by a control isolation valve 28 to a predetermined pressure associated with the fixed orifice 54 to establish the correct velocity/flow over the area to be welded. The isolation valve 80 is then opened all the way and the back pressure control device 74 is then adjusted to the pressure required at the weld site as recorded on the second pressure gauge 46. Isolation valve 80 may also be used as a manually operated back pressure control valve.

The weld purge orifice fitting 76 has a selected fixed orifice 54 sized to establish the correct velocity/flow of the purge gasses 14 over the weld area within the pipe assembly 56.

The first pressure gauge 78 is preferably a magnehelic gauge, such as manufactured by Dwyer. The first pressure gauge 78 preferably measures the purge gas pressure, normally from 0–10 inches of water column (WC). The relative pressure at the first pressure gauge 78 is adjusted by a control/isolation valve 28 to the pressure that relates to the preferred velocity/flow of the purge gasses 14 within the pipe assembly 56. Once the velocity/flow of the purge gas 14 is set, the velocity/flow does not change during welding.

Upon completion of the weld connecting the exit end 42 of the first conduit pipe section 36 and the inlet end 38 of the second conduit pipe section 40, the releasably secured airtight outlet welding header 62 is removed from the outlet end 60 of the second conduit pipe section 40, and additional conduit pipe sections (not shown) are each sequentially positioned and welded as noted herein. The welding process is repeated, with additional conduit pipe sections added and welded in place, until the entire conduit pipe assembly 56 is completed. All branches upstream of the weld area should be vented, while branches downstream of the weld area need not be vented.

It is important to note that different size outlet plugs 76 are required for different diameter conduit pipe 36, 40. The fixed orifice 54 size is selected according to the diameter of the pipe 36, 40 being welded. As shown in FIG. 2A, the fixed orifice 54 is preferably positioned off center, to improve the removal of contaminates located in the pipe 36, 40 to be welded. When positioned off center, the purge gasses 14 more effectively control and remove impurities generated during the welding process.

Figure 3:
FIG. 3 is a velocity flow chart showing the preferred velocity/flow of gas over the weld for a given range of pipe diameters.

FIG. 3 is a velocity flow chart 82 showing the preferred velocity/flow for a given range of pipe 36, 40 diameters. For example, a one-quarter inch diameter pipe having a wall thickness of 0.035 inches, requires a flow of 6 CFH at a velocity of 10 ft/sec. Other I.D. purge gas 14 flows for a given diameter pipe 36, 40 are shown in FIG. 3. The chart shown in FIG. 3 is highlighted to show the preferred velocity in feet per second, for a variety of pipe sizes 36, 40. Note that as the diameter of the pipe 36, 40 increases, the ID purge flow increases and the velocity decreases to achieve the desired result.

FIG. 4 is a diameter pressure chart 84 showing the relationship of the ID pressure in inches of water column for various diameter and wall thickness of pipes 36, 40. This diameter pressure chart 84 is used to set the back pressure on the second pressure gauge 46 prior to welding. This back pressure is maintained during the welding process.

FIG. 5 is an enlarged detail view of the manifold 66 connected to the inlet manifold fitting 64 on the outlet welding header 62, shown in FIG. 1. Note that different sized orifices 54 are selected to establish the velocity/flow of the purge gasses 14 in different sized conduit pipe 36, 40 sections during the welding process, as detailed in the velocity flow chart 82 shown in FIG. 3. The manifold 66 can be configured as a single manifold 66 component, or fabricated as several complimentary manifold 66 parts, to suit manufacturing preference.

By maintaining the velocity/flow of the purge gasses 14 during the welding process, the quality of the welds are improved, and impurities generated during the welding process are more easily removed or carried away by the purge gasses 14 flowing over the weld and exiting through the fixed orifice 54 and the backpressure control valve.

The invention being thus described, it will be evident that the same may be varied in many ways. Such variations are not to be regarded as a departure from the spirit and scope of this invention, and all such modifications and variations are intended to be included within the scope of this disclosure, and the following claims.

What is claimed is:

1. A velocity/flow measuring apparatus for precision welding of conduit pipe sections, which comprises:
   a) a purge gas supply;
   b) an inlet header in fluid communication with purge gas supply;
   c) a first conduit pipe section having an inlet end and an outlet end, the inlet end releasably secured airtight to the inlet header;
   d) a second conduit pipe section with an inlet end and an outlet end, the inlet end of the second conduit pipe section positioned adjacent to the outlet end of the first conduit pipe section to form a weld area therebetween;
   e) a pressure clamp movably secured airtight about the weld area;
   f) a second pressure gauge in fluid communication with the pressure clamp to monitor the pressure of the purge gas within the weld area;
   g) an outlet welding header releasably secured to the outlet end of the second conduit pipe section to provide an air tight seal, the outlet welding header having an outlet fitting extending therefrom;
   h) a manifold secured to the outlet welding header;
   i) a weld purge orifice fitting secured to the manifold, the weld purge orifice fitting having a fixed size orifice selected to establish the velocity/flow of the internal purge gasses passing over the weld through the first and second conduit pipe sections;
   j) a control/isolation valve;
   k) a first pressure gauge connected to the manifold, the first pressure gauge to monitor the pressure at the weld purge orifice fitting to set the velocity/flow by adjusting the control/isolation valve to establish the required pressure reading;
   l) and a back pressure control apparatus in fluid communication with the manifold and with the first and second pressure gauges.

2. The velocity/flow measuring apparatus of claim 1, wherein the first and second pressure gauges are magnehelic pressure gauges.

3. The velocity/flow measuring apparatus of claim 1, wherein the first and second pressure gauges are pressure sensors.

4. The velocity/flow measuring apparatus of claim 1, wherein the selected fixed orifice located in the outlet plug connected to the manifold is offset from the centerline of the outlet plug, to improve the removal of impurities with the purge gasses exiting through the fixed orifice.

5. The velocity/flow measuring apparatus of claim 1, wherein one or more outlet plugs are used to cap each outlet branch of the conduit pipe assembly, and at least one outlet plug has a fixed orifice to vent purge gasses, the fixed orifice size is selected to measure the velocity/flow of the purge gasses within the respective outlet branch.

6. The velocity/flow measuring apparatus of claim 5, wherein the outlet plugs located before the weld area includes:
   a cap having a fixed sized aperture with a first diameter; and
   a disk rotatably mounted to the cap, the disk having at least two fixed sized orifices and a solid area, the two fixed sized orifices and the solid area are adapted to be alignable with the fixed sized aperture of the cap, the at least two fixed sized orifices each have different diameters, wherein
   at least one of the different diameters is smaller than the first diameter of the fixed sized aperture of the cap, and
   the alignment of the fixed sized aperture and one of the at least two fixed sized orifices vent gases from the outlet branch in order to remove contaminants.

7. The velocity/flow measuring apparatus of claim 6, further comprising an o-ring in communication with the fixed sized aperture and one of the aligned at least two fixed sized orifices.

8. The velocity/flow measuring apparatus of claim 6, wherein:
   the cap includes a bore; and
   the disk includes a pin insertable into the bore for rotating the disk about the cap and aligning one of the at least two fixed sized orifices with the fixed sized aperture of the cap.

9. The velocity/flow measuring apparatus of claim 6, wherein the at least two fixed sized orifices are three or more fixed sized orifices.

10. The velocity/flow measuring apparatus of claim 1, wherein the gasses passing through the conduit pipe sections are inert gasses.

11. The velocity/flow measuring apparatus of claim 1, wherein the diameter of the conduit pipe sections are selected to be from 0.0625 inches diameter through eight inches diameter.

12. The velocity/flow measuring apparatus of claim 1, wherein the velocity of the purge gasses in feet per second is selected to be a constant velocity of from one to 10 feet per second.

13. The velocity/flow measuring apparatus of claim 1, wherein the I.D. purge flow in cubic feet per hour is selected to be from 0.02 cubic feet per hour to 2,886 cubic feet per hour, depending upon the size of the conduit pipe sections being welded.

14. The velocity/flow measuring apparatus of claim 1, wherein outlet plugs are sized to fit a selected pipe diameter, and the fixed orifice located in each of the outlet plugs is selected to establish the velocity of the purge gasses passing over the area to be welded and through the first and second conduit pipe sections.

15. The velocity/flow measuring apparatus of claim 1, wherein the pressure clamp and a weld fixture block is sequentially moved to the next conduit pipe section to be welded to the conduit pipe assembly.

16. The velocity/flow measuring apparatus of claim 1, wherein a purifier is provided when necessary to clean up gasses in the supply line adjacent to the flow meter, and the purifier comprises a chemical filter to limit oxygen and moisture to not more than 10 parts-per-billion.

17. The velocity/flow measuring apparatus of claim 1, wherein a pressure regulator is provided adjacent to the purge gas supply, the pressure regulator preferably adjusted to supply purge gas to the flow meter at 5 to 100 pounds per square inch.

18. The velocity/flow measuring apparatus of claim 1, wherein the manifold comprises:
   a T-shaped body including:
      an inlet manifold portion adapted to be fitted to an outlet welding header of the first conduit pipe section;
      a weld orifice end having a fixed sized orifice selected to establish a velocity/flow of an internal purge gas passing over the weld between the first conduit pipe section and a second conduit pipe section; and
      a weld back pressure connection; and
   an isolation control valve connected to the weld back pressure connection.

19. The velocity/flow measuring apparatus of claim 18, wherein the weld orifice includes a cap having a fixed sized aperture with a first diameter and a disk rotatably mounted to the cap, the disk having at least two fixed sized orifices alignable with the fixed sized aperture of the cap each having different diameters.

20. A velocity/flow measuring apparatus for precision welding of conduit pipe sections, which comprises:
   a) a purge gas supply;
   b) a pressure regulator to limit the purge gas to 5 to 100 pounds per square inch;
   c) a flow meter in fluid communication with the pressure regulator;
   d) a purifier with a chemical filter to limit oxygen and moisture to less than 10 parts per billion;
   e) an inlet header in fluid communication with the purifier;
   f) a first conduit pipe section having an inlet end and an outlet end, the inlet end releasably secured to the inlet header to provide an air tight fit;
   g) a second conduit pipe section with an inlet end and an outlet end, the inlet end of the second conduit pipe section positioned adjacent to the outlet end of the first conduit pipe section, to form a contiguous weld area therebetween;
   h) a pressure clamp releasably secured airtight about the weld area, the pressure clamp in fluid communication with a second magnehelic pressure gauge to monitor the pressure of the purge gas in proximity to the weld area;
   i) an outlet welding header releasably secured airtight to a manifold;
   j) a weld purge manifold fitting secured to the manifold, the weld purge manifold fitting having a fixed orifice size selected to measure and set the velocity of the purge gasses passing over the weld and through the first and second conduit pipe sections, with the velocity/flow set by adjusting the control valve and reading the first magnehelic pressure gauge to establish the selected pressure reading;
   k) additional vent purge caps used to cap each branch section of the conduit pipe assembly, each of said additional vent purge caps with a fixed orifice sized to vent purge gasses, the fixed orifice sized to set the velocity/flow of the purge gasses within the pipe branch conduits during the welding process;
   l) a first magnehelic pressure gauge connected to the manifold, the first magnehelic pressure gauge to monitor the pressure at the weld purge orifice fitting to set the velocity/flow by adjusting the control/isolation valve to establish the required pressure reading;
   m) and a back pressure control apparatus in fluid communication with the manifold;
   n) a flow control valve positioned between the manifold and the back pressure control apparatus; and
   wherein the pressure clamp and the weld fixture block are moved to the next conduit pipe section to be welded.

21. The velocity/flow measuring apparatus of claim 20, wherein the selected fixed orifice located in the outlet plug connected to the manifold is offset from the centerline of the outlet plug, to improve the removal of impurities with the purge gasses exiting through the fixed orifice.

22. The velocity/flow measuring apparatus of claim 20, wherein the diameter of the conduit pipe sections are selected to be from 0.0625 inches diameter through eight inches diameter.

23. The velocity/flow measuring apparatus of claim 20, wherein the velocity/flow of the purge gasses in feet per second is selected to be a constant velocity of from one to 10 feet per second.

24. The velocity/flow measuring apparatus of claim 20, wherein the diameter purge flow in cubic feet per hour is selected to be from 0.02 cubic feet per hour to 2,886 cubic feet per hour, depending upon the size of the conduit pipe sections being welded.

25. The velocity/flow measuring apparatus of claim 20, wherein outlet plugs are sized to fit a selected pipe diameter, and the fixed orifice located in each of the outlet plugs is selected to establish the velocity/flow of the purge gasses passing through the first and second conduit pipe sections during welding.

26. A velocity/flow measuring apparatus for precision welding of conduit pipe sections, which comprises:
   a) a purge gas supply;
   b) an inlet header in fluid communication with the purge gas supply;
   c) a control/isolation valve located between the purge gas supply and the inlet header, to selectively adjust the flow of purge gas to the inlet header;
   d) a first conduit pipe section having an inlet end and an outlet end, the inlet end releasably secured airtight to the inlet header;
   e) a second conduit pipe section with an inlet end and an outlet end, the inlet end of the second conduit pipe section positioned adjacent to the outlet end of the first conduit pipe section to form a contiguous weld area therebetween;
   f) a pressure clamp releasably secured airtight about the weld area, the pressure clamp in fluid communication with a second magnehelic pressure gauge;
   g) an outlet welding header releasably secured airtight to the outlet end of the second conduit pipe section;
   h) a manifold secured to the outlet welding header, a weld purge orifice fitting secured to the manifold, the weld purge orifice fitting having a fixed orifice sized to measure and set the velocity/flow of the purge gasses passing over the weld area and through the first and second conduit pipe sections; with additional vent purge orifice fittings used to secure each outlet branch of the conduit pipe assembly, and said additional vent purge orifice fittings with a fixed orifice to vent purge gasses, the fixed orifice selectively sized to measure and set the velocity/flow of the purge gasses within the pipe conduits prior to the welding process;

i) a first magnehelic pressure gauge in fluid communication with the manifold, the first magnehelic pressure gauge to monitor the weld purge orifice;

j) and a back pressure control apparatus in fluid communication with the manifold; and wherein the pressure clamp and a weld fixture block are moved to the next conduit pipe section to be welded.

27. The velocity measuring apparatus of claim 26, wherein the selected fixed orifice located in the outlet plug connected to the manifold is offset from the centerline of the outlet plug, to improve the removal of impurities with the purge gasses exiting through the fixed orifice.

28. A velocity/flow measuring apparatus of claim 26, wherein a pressure regulator is in fluid communication with purge gas supply, to limit the purge gas to 5 to 100 pounds per square inch; and a flow meter is in fluid communication with the pressure regulator.

29. A vent purge cap adapted for use with a velocity/flow measuring apparatus to establish purge gas velocity/flow, comprising:

a cap adapted to be fitted over a branch pipe or end portion of a conduit pipe assembly, the cap having a fixed sized aperture with a first diameter; and a disk rotatably mounted to the cap, the disk having at least two fixed sized orifices and a solid area, the two fixed sized orifices and the solid area are adapted to be alignable with the fixed sized aperture of the cap, the at least two fixed sized orifices each have different diameters, wherein at least one of the different diameters of the at least two fixed sized orifices is smaller than the first diameter of the fixed sized aperture of the cap, and each of the at least two fixed sized orifices are rotatably alignable with the fixed sized aperture of the cap.

30. The vent purge cap of claim 29, further comprising:

a bore located within the cap; and a pin extending from the disk and insertable into the bore for rotating the disk about the cap and aligning one of the at least two fixed sized orifices with the fixed sized aperture of the cap.

31. The vent purge cap of claim 29, wherein the at least two fixed sized orifices are three or more fixed sized orifices and at least two of the diameters of the fixed sized orifices are smaller than the diameter of the fixed sized aperture of the cap.

32. The vent purge cap of claim 31, further comprising an o-ring in communication with the fixed sized aperture and one of the aligned three or more fixed sized orifices.

33. The vent purge cap of claim 29, wherein the fixed sized aperture is offset from a centerline of the cap to improve removal of impurities with purge gases exiting therefrom.

34. A manifold adapted for use as a velocity/flow measuring apparatus to establish purge gas velocity, comprising:

a T-shaped body including:

an inlet manifold portion adapted to be fitted to an outlet welding header of a first pipe;

a weld orifice end having a fixed sized orifice selected to establish a velocity/flow of an internal purge gas passing over the weld between the first pipe and a second pipe; and a weld back pressure connection; and an isolation control valve connected to the weld back pressure connection.

35. The manifold of claim 34, further comprising a pressure gauge connection in fluid communication with a portion of the T-shaped body.

36. The manifold of claim 34, wherein the weld orifice includes a cap having a fixed sized aperture with a first diameter and a disk rotatably mounted to the cap, the disk having at least two fixed sized orifices alignable with the fixed sized aperture of the cap, the at least two fixed sized orifices each having different diameters.

37. A velocity/flow measuring apparatus for welding of conduit pipe sections, comprising:

a pressure clamp adapted to be movably secured about a weld area between a first pipe section and a second pipe section;

a pressure gauge in fluid communication with the pressure clamp to monitor pressure of purge gases over the weld area;

a manifold adapted to be secured to the second pipe section away from an inlet end;

a weld purge orifice fitting secured to the manifold, the weld purge orifice fitting having an orifice selected to establish a velocity/flow of the purge gas passing over the weld area;

a purge gas supply control/isolation valve;

a manifold pressure gauge connected to the manifold for monitoring the pressure at the weld purge orifice fitting so as to be able to set the velocity/flow at a predetermined level by adjusting the purge gas supply control/isolation valve; and a back pressure control apparatus in communication with the manifold and with the pressure gauge and the manifold pressure clamp.

38. The velocity/flow measuring apparatus of claim 37, further comprising a cap adapted to vent purge gases from branch outlets of the first or second pipe sections located at least one of before and after the weld area.

39. The velocity/flow measuring apparatus of claim 38, further comprising a sized orifice adapted to be fitted within a hole of the cap to vent purge gasses from the outlet branches located before the weld area.

40. The velocity/flow measuring apparatus of claim 39, wherein the orifice size is selected based on a size of the outlet branches located before the weld area.

* * * * *